UNITED STATES PATENT OFFICE.

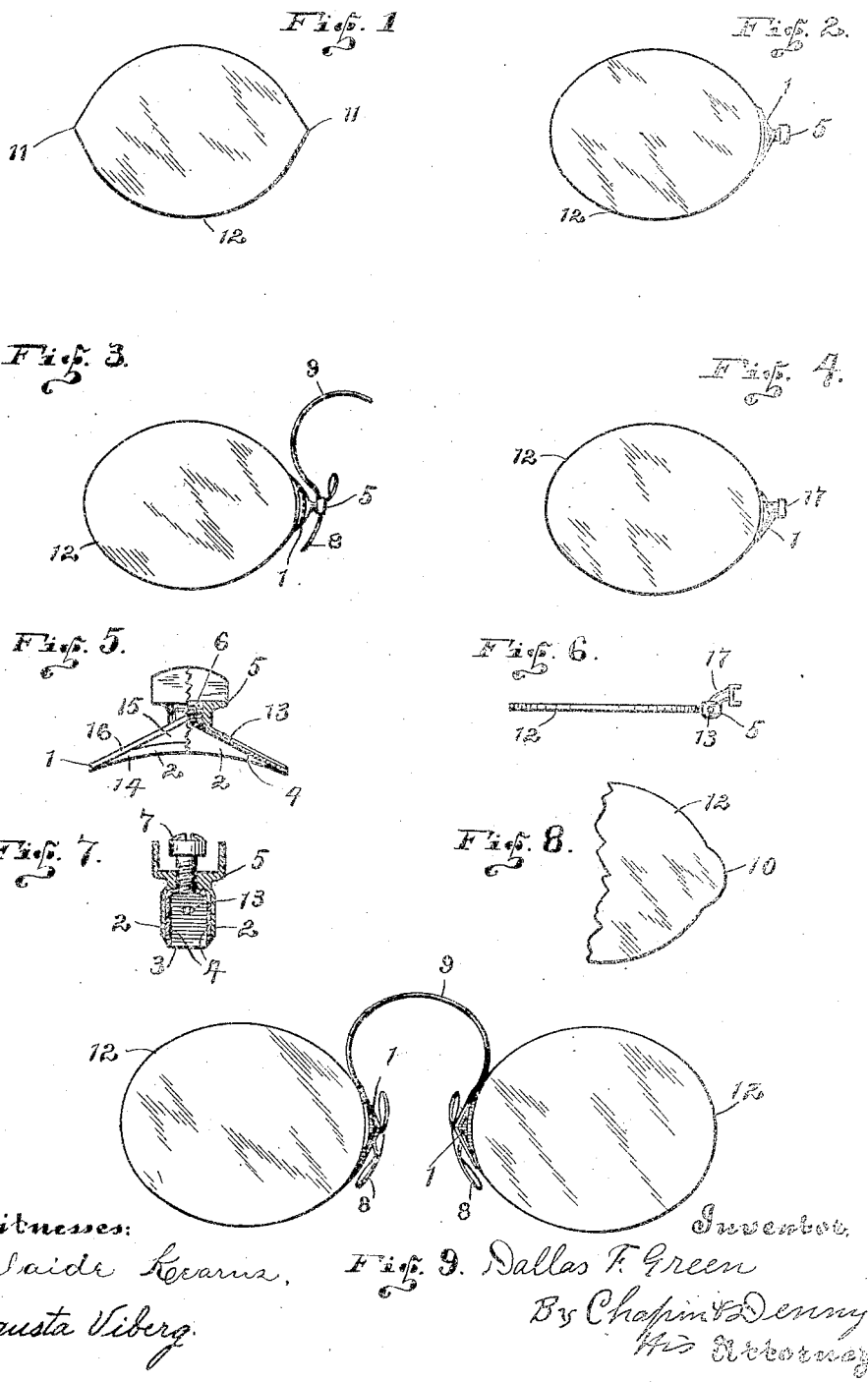

DALLAS F. GREEN, OF FORT WAYNE, INDIANA.

LENS-MOUNTING.

954,513.     Specification of Letters Patent.     Patented Apr. 12, 1910.

Application filed April 10, 1908. Serial No. 426,232.

*To all whom it may concern:*

Be it known that I, DALLAS F. GREEN, a citizen of the United States, residing at Fort Wayne, in the county of Allen, in the State of Indiana, have invented certain new and useful Improvements in Lens-Mountings; and I do hereby declare that the following is a full, clear, and exact description of the invention, which will enable others skilled in the art to which it appertains to make and use the same, reference being had to the accompanying drawings, which form part of this specification.

My present invention relates to improvements in lens mountings for frameless eye glasses and spectacles.

It is well known that in rimless eyeglasses and spectacles as at present universally constructed the lens mountings are secured to the lens by stud-screws, which requires the drilling of a stud-screw hole in one or both ends of the lenses, whereby the lenses are weakened at the points of attachment of the metallic mountings; that unless very accurately adjusted these screws cause a breaking strain upon the lens; that the drilling of these holes often causes a breakage of the lens; and that these stud-screws unavoidably project into the field of vision to the annoyance of the wearer.

The object of my present invention is to provide a coöperative combination of the lens and its metallic mounting for the rimless type of eye glasses and spectacles, so constructed as to be secured to the end of the lenses without the use of screws, bolts, or rivets, and without projecting the same into either the field of the lens or the field of vision.

My invention consists of a hollow, substantially crescent like stud-box, having an integral stud-post of common form, the whole being made of suitable metal and lined with copper, or other material, to which cement will firmly adhere, in combination with the eye glass lens.

The principal novel feature of my invention resides in a metallic lens mounting adapted to so embrace, and be so anchored to the end of the lens as to avoid the necessity of weakening the lens by drilling openings in the same, and adapted to avoid the use of stud-screws or other clamping devices which project into the line of vision and within the field of the lens, or of vision.

Another novel feature of my invention resides in the specific construction and coöperative relation of the mounting whereby the same is secured in position entirely outside of the field of the lens.

Similar reference numerals indicate like parts throughout the several views in which—

Figure 1 is a view of one form of lens adapted for use with my lens mounting for spectacles, showing the pointed longitudinal projections to which the metallic mountings are secured entirely outside of the field of the lens. Fig. 2 is a view of a lens having the same form of projection upon one end thereof, as shown in Fig. 1, and upon which the metallic mounting is operatively fixed, the projection being shown in dotted outline. Fig. 3 is a view of an eye glass lens having a terminal projection, shown in dotted outline, and like that shown in Fig. 8, with my improved mounting in position thereon, and preserving the entire field of the lens, and also showing the relative arrangement of the nose-guard, and the nose-spring partly broken away. Fig. 4 is an eye glass lens having upon its inner end a terminal projection of the form shown in Fig. 1, as shown in dotted outline, with another modified form of my invention having a stud post arranged slightly out of alinement with the body of the mounting, for a well understood purpose. Fig. 5 is an enlarged detail, partly in vertical central section, of the preferred form of my invention, and adapted to fit the form of lens shown in Fig. 1, as seen in Fig. 2. Fig. 6 is a plan view of Fig. 4 showing the arrangement of the off-set post. Fig. 7 is a central cross-section of Fig. 5 with the stud screw in position therein. Fig. 8 is a fragmentary view of one end of the lens showing the form of projection employed in Fig. 3. Fig. 9 is a front elevation of a pair of eyeglasses in which my invention is employed.

The stud-box 1 has parallel sides 2 whose upper edges are united by a substantially crescent shaped integral portion 3, and is adapted to embrace the sides and edges of the lens at its ends. As no known cement will adhere to gold I have provided the hollow interior of the stud-box with a thin lining of copper or other non-corrosive metal 4 to which cement will securely and rigidly adhere. The stud-box is also provided with an integral bifurcated stud-post 5 having a central screw-threaded perforation 6 for the usual stud-screw 7, by which the nose-guard 8 and the ends of the nose-spring or bridge 9 are secured to the stud-post in the usual manner. The hollow interior of the stud-box is made to fit the lens projection, which may be of any desired form, as at 10 in Fig. 8, though preferably of the form shown at 11 in Fig. 1. The stud-box in all of its slightly modified forms is rigidly secured to the lens by means of suitable cement; and the lining of the stud-box may be slightly roughened, if desired to improve the cementing surface.

The upper face of the stud-box is preferably provided with a very small vertical perforation 15, Figs. 5 and 7, to permit the ready escape of any excess of cement incident to fitting the mounting in position on the lens, and thereby prevent the same from getting onto the lens within the field of the lens, in the operation of fitting the mounting thereto. The outer sides of the stud-box are preferably formed with three or more faces 14, 15 and 16, Figs. 5 and 7, arranged in different planes, whereby as each face reflects the high light at a different angle the apparent size, and conspicuousness thereof is very materially diminished. While this feature of my invention is important I do not consider it absolutely essential.

The employment of the off-set stud-post 17, shown in Figs. 4 and 6 is for the well understood purpose of varying the distance between the lens and the eyes of the wearer, and in my lens mounting it is made an integral part without detracting from the neatness and compactness of the mounting. It is apparent that the form of mounting shown in Fig. 5 is self adjusting when applied to the form of lens shown in Figs. 1 and 2, since the point thereof will automatically adjust itself to the angular seat of the stud-box.

It is obvious that when my invention is mounted upon a terminal lug 11 and rigidly secured thereon by cement, it will be located entirely outside of the field of the lens, as seen in Figs. 2, 3 and 4, thereby keeping the same out of the line of vision in use, and also greatly enhancing the attractive appearance of the eye glasses upon which it is employed. It is also apparent that even when the terminal projection is omitted, and the common form of lens is employed my lens mounting can be used thereon without appreciably extending into the field of the lens, and without presenting the usual objection of unsightliness.

Having thus described my invention and the manner of employing the same what I desire to secure by Letters Patent is:

1. An eyeglass lens having a longitudinal projection located outside of the field of the lens; a metallic mounting fixed on the said projection; and a cementitious medium rigidly uniting the mounting to the projection, and forming the sole uniting medium therebetween.

2. In eyeglasses a lens having a terminal lug forming an anchorage for the mounting; a metallic mounting fixed on the said lug outside of the field of the lens; and a cementitious material connecting the lug and mounting.

3. In eyeglasses a lens having a terminal pointed lug on one end thereof to form a self-centering anchorage for the mounting; a metallic mounting fixed on the said lug outside of the field of the lens, and consisting of a hollow box whose interior conforms in contour to the said lug; and a cementitious means for uniting the lug and mounting.

4. In eyeglasses a lens having upon one end thereof a tapering lug forming a support for the mounting; a metallic mounting fixed on the lug outside of the field of the lens, and consisting of a box whose inner edge conforms to the perimeter of the lens, and is provided with perforations for the escape of excess cement; and a cementitious material uniting the lug and mounting.

5. In eyeglasses a lens provided upon one end with a mount anchoring extension tapering in contour; a metallic mount fixed on the extension outside of the field of the lens and having a suitable lining whose contour conforms to the shape of the lens extension to form a self-centering connection therewith; and a cementitious means for fixing the mount in position.

6. In eyeglasses a lens provided with a terminal tapering lug for the metallic mounting; a metallic mounting fixed on the lug clear of the field of the lens, and having a metallic lining which conforms to the contour of the lens lug to form a self-centering connection therewith, and provided with means for the escape of excess cement; and a cementitious means for uniting the mounting to the lug.

7. A mounting for eyeglasses consisting of a metallic box having a metallic lining to which both metal and glass can be rigidly united by cement, and provided with outlet perforations for excess cement.

Signed by me at Fort Wayne, Allen county, State of Indiana, this 8th day of April, 1908.

DALLAS F. GREEN.

Witnesses:
AUGUSTA VIBERG,
AUGUSTE SPIEGEL.